US005206073A

United States Patent [19]

Suzuki

[11] Patent Number: 5,206,073

[45] Date of Patent: Apr. 27, 1993

[54] ELECTROSTATIC SPRAY-COATED POLYCRYSTALLINE RESIN ARTICLE

[75] Inventor: Yoshiharu Suzuki, Shizuoka, Japan

[73] Assignee: Polyplastics Co., Ltd., Osaka, Japan

[21] Appl. No.: 838,935

[22] Filed: Feb. 21, 1992

Related U.S. Application Data

[62] Division of Ser. No. 407,933, Sep. 15, 1989, Pat. No. 5,135,773.

[30] Foreign Application Priority Data

May 10, 1988 [JP] Japan ................................ 63-251671

[51] Int. Cl.$^5$ ................................................ B32B 9/00

[52] U.S. Cl. .................................... 428/195; 428/323; 428/409; 428/480

[58] Field of Search ............... 428/409, 323, 419, 480; 427/27, 272

[56] References Cited

U.S. PATENT DOCUMENTS

| | | | |
|---|---|---|---|
| 4,269,892 | 5/1981 | Shattuck | 428/323 |
| 4,678,701 | 7/1987 | Pennington | 428/409 |
| 4,849,287 | 7/1989 | Hoh | 428/409 |

*Primary Examiner*—Patrick J. Ryan
*Assistant Examiner*—W. Krynski
*Attorney, Agent, or Firm*—Nixon & Vanderhye

[57] ABSTRACT

A molded article of a crystalline thermoplastic resin is electrostatically coated by preparing the molded article from a composition comprising 100 parts by weight of the crystalline thermoplastic resin and 2 to 100 parts by weight of one or more electrically conductive fillers. The surface of the molded article is roughened so as to expose the electrically conductive filler on the article's surface and thereby enhance the article's electrical conductivity. Surface roughening of the article may be accomplished through (1) chemical techniques and/or (2) physical techniques. The thus surface roughened article may then be electrostatically spray coated.

3 Claims, 1 Drawing Sheet

ELECTROSTATIC SPRAY-COATED POLYCRYSTALLINE RESIN ARTICLE

This is a division of application Ser. No. 07/407,933, filed Sep. 15, 1989, now U.S. Pat. No. 5,135,773.

FIELD OF INVENTION

The present invention relates to improved electrostatic coating methods and coated articles whereby a coating having excellent adhesion can be formed on a molded article formed of a crystalline thermoplastic resin.

BACKGROUND AND SUMMARY OF THE INVENTION

Air spraying methods have conventionally been used in the art to coat articles formed of a crystalline thermoplastic resin. However, the coating deposition efficiency for such air spray methods is as low as between about 20 to 50%, thereby inevitably increasing the cost of the coated articles. For this reason, electrostatic coating has attracted attention as an alternative method which can achieve high paint coating deposition efficiency. However, electrostatic coating has typically been utilized for coating electrically conductive metals, and thus has not been employed as a means to coat articles formed of a material having poor electrical conductivity (e.g. resins).

It has however been proposed to apply to resin articles an undercoat of a conductive agent composed mainly of a cationic surfactant to the surface of plastic articles so as to achieve electrical surface conductivity of between $10^3$ to $10^9\Omega$. Thereafter, the plastic article may be subjected to electrostatic coating. However, since this proposed method requires the use of a hydrophilic solvent as the conductive agent, the surface of the molding may attract moisture to the extent that pinholes and blisters are formed during drying of the top coating. Furthermore, although such an undercoat can be applied to an amorphous thermoplastic resin, its application to a thermoplastic resin causes an adverse effect on the adhesive strength of the coating.

In addition to the above-mentioned prior proposals, it has also been suggested to employ a primer paint containing a conductive filler (rather than using a conductive agent for imparting conductivity to the paint). However, significant economic disadvantages are presented by use of a conductive primer, including the necessity to resort to the inefficient air spray coating method when applying the primer, an increase in the number of coating types, difficulties when applying a uniform coating to complex moldings, and the necessity that the coating step be accomplished manually (rather than via automated procedures). In addition, further difficulties are encountered when a thin film coating is applied resulting in film adhesion which is usually less than satisfactory.

By way of the present invention, electrostatic coating methods are proposed which exhibit high coating deposition efficiency in the electrostatic surface coating of crystalline thermoplastic resins. The resulting coating exhibits excellent adhesive strength. Thus, according to the present invention, a film coating having high adhesive strength can uniformly be obtained with high coating deposition efficiency by roughening the surface of a molded article of a crystalline thermoplastic resin having electrical conductivity imparted thereto by the addition of a conductive filler. By roughening the molded article, a thin polycrystalline resin skin layer normally covering the surface of the article is removed, thereby enhancing the article's electrical conductivity by exposing the article's conductive filler on the surface of the molding. At the same time, the paint adhesion properties are improved by means of such surface-roughening through an anchoring effect onto the surface of the molding.

BRIEF DESCRIPTION OF THE ACCOMPANYING DRAWING

Accompanying FIG. 1 schematically shows in perspective view an automobile door handle used as a test piece in the following Examples, with surfaces A–D being used to evaluate the coating appearance thereof.

DETAILED DESCRIPTION OF THE PREFERRED EMBODIMENTS

Figure 1:
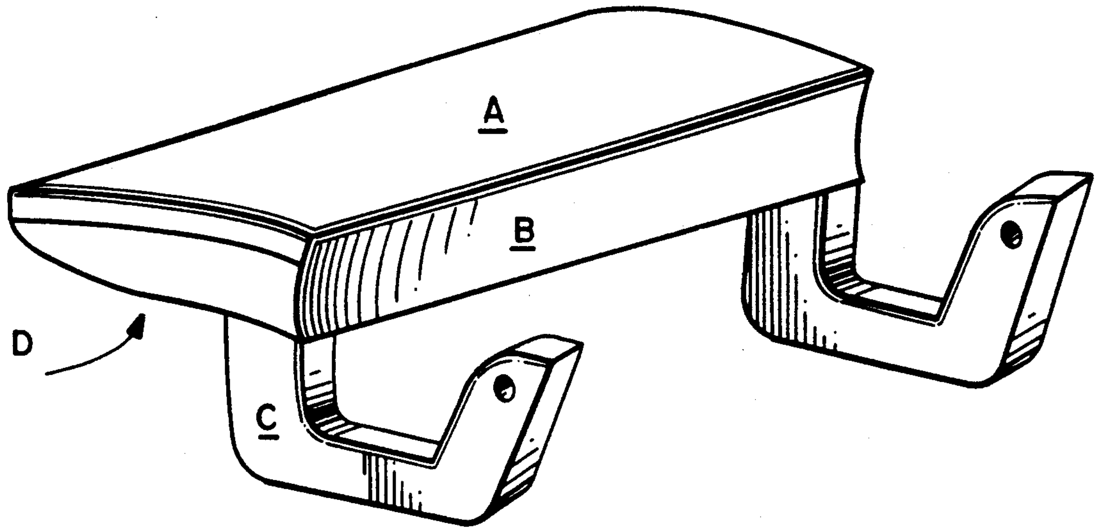

The present invention is broadly embodied in a method for the electrostatic spray coating of a molded article consisting essentially of a crystalline thermoplastic resin. More specifically, the method includes preparing a molded article of a composition comprising 100 parts by weight of the crystalline thermoplastic resin, and 2 to 100 parts by weight of one or more electrically conductive fillers, and thereafter roughening the surface of the article through (1) a chemical method and/or (2) a physical method. The surface roughened resin article may then be coated electrostatically.

Preferred physically roughening techniques include liquid honing, sandblasting, laser etching, sputter etching and plasma etching. On the other hand, preferred chemical roughening techniques include immersing the article in an aqueous solution of sulfuric acid, hydrochloric acid, nitric acid, chromic acid, phosphoric acid, sodium hydroxide and potassium hydroxide. The roughening step improves the adhesion between the article and the electrostatically coated layer.

The crystalline thermoplastic resin useful to form articles which may be electrostatically coated according to this invention include, for example, polyacetal, polyester and polyphenylene sulfide.

The electrically conductive filler in admixture with the thermoplastic resin may be in the form of particles, flakes or fibers having an average size of 30 micrometers or smaller. Such fillers may be selected from metals, electrically conductive carbon, and electrically conductive potassium titanate "whiskers".

Accordingly, the present invention relates to a method whereby a crystalline thermoplastic resin molding may be electrostatically spray coated. More specifically, the invention is characterized by roughening the surface of a molding prepared from a resin composition comprising 100 parts by weight of a crystalline thermoplastic resin and 2 to 100 parts by weight of at least one conductive filler through a physical process comprising at least one of liquid honing, sandblasting, laser etching, sputter etching, and plasma etching and/or a chemical process comprising immersing the molded article in an aqueous solution containing at least one member selected from among sulfuric acid, hydrochloric acid, nitric acid, chromic acid, phosphoric acid, sodium hydroxide, and potassium hydroxide, and then subjecting the resultant surface-roughened molding to electrostatic coating.

Examples of the crystalline thermoplastic resin include polyethylene, polypropylene, polyacetal, polyester (e.g. polyethylene terephthalate, polybutylene terephthalate, wholly aromatic polyesters, and the like), polyphenylene sulfide, polyamide resins, fluororesins, and polymethylpentene-1. These resins may be used alone or in the form of a mixture of two or more such resins. Further, it is also possible to add as auxiliary components small amounts of amorphous thermoplastic resins (e.g., ABS, acrylic resins, polycarbonates, or phenoxy resins). The crystalline thermoplastic resin is preferably mainly composed of a polyacetal resin, a polyester resin, and/or polyphenylene sulfide resin.

Examples of the fibrous conductive fillers useful in the present invention include carbon fibers (derived from PAN and pitch), metallic fibers (mild steel, stainless steel, copper and its alloys, brass, aluminum and its alloy, lead, etc.), metallized glass fibers (glass fibers coated with nickel, copper, aluminum, silver, etc.), metal-coated carbon fibers, and conductive potassium titanate whiskers.

Examples of the flaky and particulate conductive fillers useful in the present invention include various metal powders (iron, copper, aluminum, silver, gold, nickel, zinc, brass, lead, and stainless steel) and their flakes, various carbon powders (Ketjen black, acetylene black, SRF carbon, graphite, activated carbon, etc.), and further carbon microballoon, and glass flakes coated with metals such as nickel, silver, and copper.

The conductive filler used in the present invention is preferably a particulate material having an average particle diameter of 30 μm or less (or flaky material) and/or a fibrous material having an average diameter of 30 μm or less, still preferably a particulate material having an average particle diameter of 15 μm or less or a fibrous material having a fiber diameter of 15 μm or less, and at least one member selected from the group consisting of Ketjen black, acetylene black, carbon fiber, conductive potassium titanate whisker, stainless steel (fiber, powder, and flake), and aluminum (fiber, powder, and flake). In general, the finer the conductive filler, the better the finish and appearance of the molded article. Furthermore, the use of finer conductive fillers is more advantageous in terms of coating deposition efficiency during electrostatic coating, adhesive strength, physical properties, and the like.

The amount of the conductive filler mixed with the resin such that the resin article exhibits a surface resistivity of $10^0$ to $10^9\Omega$ necessary for conducting electrostatic spray coating. In the present invention, the conductive filler is preferably employed in an amount between 2 to 100 parts by weight, particularly 5 to 60 parts by weight, based on 100 parts by weight of the crystalline thermoplastic resin. When the amount of filler is less than 2 parts by weight, the surface resistivity value of the molding exceeds $10^9\Omega$ and thereby unfavorably lowers the coating deposition efficiency during the electrostatic coating. On the other hand, when the amount of filler exceeds 100 parts by weight, not only does it become more difficult to produce the resin composition per se, but also lower mechanical properties such as tensile strength and tensile elongation result.

Removal of the surface layer of the crystalline thermoplastic resin molding by physical and/or chemical surface roughening beneficially eliminates local uneveness of the molding and makes it possible to attain uniform surface resistivity. It is therefore possible to perform uniform electrostatic spray coating even when the amount of the filler used is relatively small.

The resin composition containing the conductive filler incorporated therein may also be admixed with known materials generally added to thermoplastic resins, thermosetting resins, etc., i.e., stabilizers such as antioxidants, heat stabilizers and ultraviolet absorbers, antistatic agents, flame retardants, coloring agents such as dyes and pigments, lubricants, crystallization promoters, and nucleating agents. These optional additives should, however, be used in amounts that will not adversely affect the resins' coatability, and particularly, the film adhesion property of the coating. In order to improve the mechanical properties and to further improve the adhesion property of the coating film, organic or inorganic fibrous, particulate or flaky nonconductive fillers may be added in combination with the conductive filler according to the required and/or desired performance characteristics for the resin article.

Examples of the fibrous filler which may be used in combination with the conductive filler include glass fibers, silica fibers, silica-alumina fibers, zirconia fibers, boron nitride fibers, silicon nitride fibers, and boron fibers. A representative fibrous filler is a glass fiber. Further, it is also possible to use high-melting organic fibrous materials such as polyamide and acrylic resins.

Examples of the particulate fillers include silica, ground quartz, glass bead, glass powder, silicates such as calcium silicate, aluminum silicate, kaolin, talc, clay, diatomaceous earth and wollastonite, metallic oxides such as iron oxide, titianium oxide, zinc oxide, lead oxide, aluminum oxide, magnesium oxide, calcium oxide and barium oxide, metallic carbonates such as calcium carbonate, magnesium carbonate and zinc carbonate, metallic sulfates such as calcium phosphate, magnesium phosphate and calcium pyrophosphate, and other fillers such as silicon carbide, silicon nitride and boron nitride. Examples of flaky fillers include mica and glass flake.

In particular, the combined use of an inorganic filler of metallic oxides such as magnesium oxide, calcium oxide, barium oxide, zinc oxide, lead oxide, aluminum oxide and titanium oxide, metallic carbonates such as calcium carbonate, magnesium carbonate and zinc carbonate, and other fillers such as metallic sulfates and phosphates brings about formation of micropores during chemical etching, which micropores beneficially contribute to an improvement in the adhesion of the film coating by virtue of an anchoring effect.

The resin composition containing a conductive filler incorporated therein and used in the present invention is generally prepared by making use of known equipment and methods commonly employed in the preparation of synthetic resin compositions. Specifically, the compositions may be prepared by mixing necessary components, kneading and extruding the mixture with a single- or twin-screw extruder to prepare pellets for molding, and then molding the pellets to form desired articles. It is also possible to simultaneously prepare the composition and mold the article in a unitary molding machine. Further, in order to improve the dispersion and mixing of each component, it is possible to employ a method which comprises pulverizing a part or the entire resin component, mixing the components, melt-extruding the mixture to prepare pellets, and then molding the pellets.

The above-described materials to be compounded, such as stabilizers and additives, may be added in any stage. It is usually preferred, however, that they be added and mixed immediately before preparation of the final molding.

The molding used in the present invention may be prepared by extrusion molding, injection molding, compression molding, vacuum molding, blow molding, or foam molding.

The present invention is characterized by roughening the surface of the molding of the crystalline thermoplastic resin composition prepared by the above-described method through physical and/or chemical treatment and then performing electrostatic coating of the treated molding.

Examples of physical surface roughening techniques that may be employed include mechanical roughening methods, such as liquid honing and sandblasting, and other methods such as sputter etching, laser etching and plasma etching. Of these, plasma etching is preferred.

Although the plasma etching may be conducted by making use of known apparatus and method, the adoption of the following method further ensures the electrostatic coating method of the present invention. Specifically, use is made of a bell jar type or cylindrical flow reactor. After the inside of the reactor is evacuated to a vacuum of $1\times10^{-3}$ Torr or less, an inert gas such as argon is introduced to regulate the pressure in the reactor to $1\times10^{-1}$ Torr. A high d.c. voltage is applied across a pair of electrodes provided within the reactor to generate a plasma through ionization by electron bombardment or through ionization by the high-frequency electric field of radio waves. The plasma comprises excited molecules, ions, electrons, ultraviolet rays, and the like. When a sample to be treated is placed between the electrodes, the surface of the sample is activated by the generated plasma. Various other gases may optionally be introduced instead of argon, in which case the surface of etching achieves surface characteristics in dependence upon the gases used.

Chemical surface roughening including immersing the resin molding in an aqueous solution (etching solution) containing at least one member selected from among sulfuric acid, hydrochloric acid, nitric acid, chromic acid, phosphoric acid, sodium hydroxide, and potassium hydroxide. For example, an electrostatically coated resin molding having excellent adhesive strength can be prepared by making use of the following combination of a crystalline thermoplastic resin with an etching solution and an immersion condition.

| Crystalline thermoplastic resin | Etching solution | Immersion condition temp. (°C.) | time (min) |
|---|---|---|---|
| polyethylene resin | 98% sulfuric acid/ chromic acid: 50–30 wt %/50–70 wt % | 20–70 | 1–5 |
| polypropylene resin | 98% sulfuric acid/ chromic acid: 50–30 wt %/50–70 wt % | 20–70 | 1–5 |
| polyacetal resin | 98% sulfuric acid/ 85% phosphoric acid/ water: 50–30 wt %/ 30–15 wt %/20–55 wt % | 20–50 | 2–15 |
| | 98% sulfuric acid/ 36% hydrochloric acid/ water: 60–35 wt %/ 20–10 wt %/20–55 wt % | 20–50 | 2–15 |
| polybutylene terephthalate resin | 20–40% sodium hydroxide | 20–70 | 2–15 |
| polyethylene terephthalate resin | 20–40% sodium hydroxide | 20–70 | 2–15 |
| crystalline polyester resin | 30–50% sodium hydroxide | 30–70 | 3–15 |
| polyphenylene sulfide resin | 40–70% nitric acid | 20–50 | 3–15 |
| polyamide resin | 5–30% hydrochloric acid | 20–50 | 3–15 |

The etching conditions (liquid composition, temperature, treating time, etc.) may be investigated and selected depending upon the material for the molding through trial-and-error experiments. Although the etching conditions are not limited to the above-described examples only, these examples are recommended as preferred combinations.

The surface-treated molding is then subjected to electrostatic coating.

The electrostatic coating is conducted by making use of an electrostatic coating device conventionally employed in the art. Such a device may be, for example, an instrument having a paint atomizing device and a discharge electrode at the tip of an electrical insulator. The device may be any of the stationary, portable, or automatic coating types. Examples of the atomization mechanism include electrical atomization and airless atomization, and examples of the form of the discharge electrode include those of stationary and rotary types. Such devices may be used in combination for practicing the present invention.

In general, higher electrostatic field voltages employed during electrostatic coating result in higher coating deposition efficiencies because of the strong action of the mutual attractive force between positive and negative electrodes. The electrostatic coating is generally conducted at between 60 to 100 kV.

The electrostatic coating according to the present invention may be conducted by making use of apparatus and techniques conventionally employed for coating metal articles. That is, neither particular devices nor special techniques are necessary.

Examples of the paint that may be used include phthalate resin paints, melamine resin paints, epoxymelamine resin paints, acrylic paints, urethane paints, unsaturated polyester resin paints, and silicone resin paints. Some of these paints will not be electrified even when an electric charge is applied during electrostatic coating. In such a case, it is effective to use a paint dissolved in an organic solvent such as an alcohol or ester.

The present invention is characterized by incorporating a conductive filler within a crystalline thermoplastic resin molding preferably so as to provide a surface resistivity of the molding of $10^9\Omega$ or less for the purpose of satisfactorily conducting electrostatic coating of the molding and for the purpose of maintaining sufficient coating adhesion for long time periods. This makes it possible to economically prepare a coated molding having excellent adhesion from a crystalline thermoplastic resin molding which inherently exhibits poor coatability characteristics.

The electrostatic coating method and coated crystalline thermoplastic resin molding according to the present invention exhibit the following effects:

(1) production is very economical by virtue of high coating deposition efficiency;

(2) excellent adhesive strength of the film coating can be achieved for crystalline thermoplastic resin (which cannot normally achieve even remotely comparable adhesive strengths);

(3) any molding form may be coated—e.g., coating may be practiced even when the molding has a complex shape and/or an uneven form;

(4) since the coating deposition efficiency is as high as 70 to 80%, no significant solvent diffusion occurs (which contributes to an improvement in the worker's environment during coating);

(5) it is possible to form an integral coating together with a conventional metallic molding; and (6) the amount of filler necessary to impart electrical conductivity to the article can be reduced, thereby increasing the strength of the material.

The electrostatic coating method of the present invention is suitable for use in coating trims of an automobile, e.g., instrument covers, instrument panels, steering wheel and knob, exterior furnishing, e.g., outer door handles, antenna parts, wheel caps, door mirror stays, fuel lids, front fenders and spoilers, various electromagnetic shielding casings, cases for various electric appliances, instrument covers, handles, etc. for decoration, exterior parts of cameras and watches and clocks, and parts of furniture requiring heat resistance, etc.

EXAMPLES

The present invention will now be described with reference to the following Examples which should not be construed as limiting the scope of the present invention.

In the Examples, the surface resistivity value and coating were evaluated by the following methods.

1) Surface resistivity value

A molding after surface roughening (or before surface roughening in the case of some Comparative Examples) was degreased with isopropyl alcohol and then subjected to measurement of surface resistivity with a tester (HIOKI 3116 DIGITAL MΩ Tester).

2) Coating appearance (a) Throwing property of paint

In electrostatic coating of an outer door handle of an automobile as shown in FIG. 1, the degree of throwing of a finishing paint was evaluated according to the following five ranks:

0 point . . . deposition on only A section (top surface) and poor deposition on the periphery, 1 point . . . deposition on A and B sections, 2 point . . . deposition on the whole surface of A and B sections and the side of C section, 3 point . . . deposition on A, B, and C sections and slight deposition on D section, and 4 point . . . deposition on the whole surface of both sides of the handle.

(b) Gloss of coated surface

After the door handle shown in FIG. 1 was coated, a fluorescent lamp image was projected on the top surface A section under a fluorescent lamp (40 W), and the state of projection of the image was evaluated according to the following five ranks:

0 point . . . projection of no image of the fluorescent lamp, 1 point . . . dim image of the fluorescent lamp, 2 point . . . waved image of the fluorescent lamp, 3 point . . . slightly dimmed contours of the fluorescent lamp image, and 4 point . . . clear projection of the fluorescent lamp.

3) Coating performance (a) Initial adhesion

After a coated article was allowed to stand at room temperature for 24 hours, 11 scratches were made crosswise at intervals of 1 mm with a cutter knife. A cellophane tape (a product of Nichiban Co., Ltd.; specified in JIS; a width of 18 mm) was put on the formed measure comprising 100 squares of 1 mm. After pressing the tape by hand, the tape was peeled off, and the number of remaining squares was expressed based on 100 original squares.

(b) Adhesion after waterproofness test

A coated article was immersed in hot water (distilled water) kept constant at 50° C. for 120 hours, taken out of the hot water, allowed to stand at room temperature for 24 hours, and subjected to evaluation of the adhesion in the same manner as that used in the measurement of the initial adhesion.

EXAMPLES 1 to 21 AND COMPARATIVE EXAMPLES 1 TO 25

As shown in Table 1, after conductive filler was added and blended with a crystalline thermoplastic resin, the mixture was melt kneaded with a twin-screw extruder at a temperature above the melting point of the resin used to prepare a pelletized composition. A model of an outer door handle of an automobile (project area: 120 mm×30 mm) shown in FIG. 1 was molded with an injection molding machine (J75SA; a product of The Japan Steel Works, Ltd.).

The molded door handle was surface-roughened by physical and chemical treatments shown in Table 1, washed with a solvent or hot water at 60° to 80° C. (except for treatment C-1), dried, coated with a paint shown in Table 1 by electrostatic coating by making use of an automatic electrostatic coater (Auto REA Gun; mfd. by RANSBURG-GEMA KK) under a voltage of 60 kV and anatomization air pressure of 1.5 kg/cm$^2$, set for 10 min, stoved and cured under curing conditions shown in Table 1, and applied to evaluation of a coated article. For comparison, the same evaluation was conducted on the case where electrostatic coating was conducted for a molding prepared without addition of a conductive filler and on the case where electrostatic coating was conducted without surface roughening of the molding. The results are summarized in Table 1.

TABLE 1

| | Crystalline[1)] thermoplastic resin (wt %) | Conductive filler[2)] (wt %) | Surface[3)] roughening (phys. & chem. treatment) | Electrostatic coating Paint[4)] (curing condn., temp., time) | Surface[5)] resistivity (Ω) | Coating appearance: Throwing property | Coating appearance: Gloss | Coating performance: Initial adhesion | Coating performance: Adhesion after water-proofness test |
|---|---|---|---|---|---|---|---|---|---|
| Ex. No. | | | | | | | | | |
| 1 | A-1 (96) | B-1 (4) | C-1 | D-1 (140° C., 30 min) | 4.6 × 10$^6$ | 4 | 4 | 100/100 | 100/100 |

TABLE 1-continued

| | Crystalline[1)] thermoplastic resin (wt %) | Conductive filler[2)] (wt %) | Surface[3)] roughening (phys. & chem. treatment) | Electrostatic coating Paint[4)] (curing condn., temp., time) | Surface[5)] resistivity (Ω) | Coating appearance: Throwing property | Coating appearance: Gloss | Coating performance: Initial adhesion | Coating performance: Adhesion after water-proofness test |
|---|---|---|---|---|---|---|---|---|---|
| 2 | A-1 (96) | B-1 (4) | C-2 | D-1 (140° C., 30 min) | $4.6 \times 10^6$ | " | 4 | " | " |
| 3 | A-1 (90) | B-2 (10) | C-1 | D-1 (140° C., 30 min) | $2.5 \times 10^6$ | " | 3 | " | " |
| 4 | A-1 (90) | B-2 (10) | C-2 | D-1 (140° C., 30 min) | $2.5 \times 10^6$ | " | 3 | " | " |
| 5 | A-1 (90) | B-3 (10) | C-1 | D-1 (140° C., 30 min) | $3.5 \times 10^6$ | " | 4 | " | " |
| 6 | A-1 (90) | B-3 (10) | C-2 | D-1 (140° C., 30 min) | $3.5 \times 10^6$ | " | 4 | " | " |
| 7 | A-1 (92) | B-1 (8) | C-2 | D-1 (140° C., 30 min) | $2.8 \times 10^6$ | " | 4 | " | " |
| 8 | A-1 (96) | B-1 (4) | " | D-2 (140° C., 30 min) | $4.6 \times 10^6$ | " | 4 | " | " |
| 9 | A-1 (96) | B-1 (4) | " | D-3 (140° C., 30 min) | $4.6 \times 10^6$ | " | 4 | " | " |
| 10 | A-1 (96) | B-1 (4) | " | D-4 (80° C., 30 min) | $4.6 \times 10^6$ | " | 4 | " | " |
| 11 | A-2 (96) | B-1 (4) | C-1 | D-1 (140° C., 30 min) | $5.1 \times 10^6$ | " | 4 | " | " |
| 12 | A-2 (96) | B-1 (4) | C-3 | D-1 (140° C., 30 min) | $5.1 \times 10^6$ | " | 4 | " | " |
| 13 | A-2 (90) | B-2 (10) | " | D-1 (140° C., 30 min) | $7.2 \times 10^7$ | " | 3 | " | " |
| 14 | A-2 (90) | B-3 (10) | " | D-1 (140° C., 30 min) | $3.1 \times 10^6$ | " | 4 | " | " |
| 15 | A-2 (90) | B-3 (10) | " | D-3 (140° C., 30 min) | $3.1 \times 10^6$ | " | 4 | " | " |
| 16 | A-3 (96) | B-1 (4) | C-4 | D-1 (140° C., 30 min) | $5.6 \times 10^8$ | " | 4 | " | " |
| 17 | A-3 (90) | B-2 (10) | " | D-1 (140° C., 30 min) | $1.3 \times 10^6$ | " | 3 | " | " |
| 18 | A-3 (90) | B-3 (10) | " | D-1 (140° C., 30 min) | $2.7 \times 10^6$ | " | 4 | " | " |
| 19 | A-4 (96) | B-1 (4) | C-5 | D-1 (140° C., 30 min) | $5.3 \times 10^8$ | " | 4 | " | " |
| 20 | A-4 (90) | B-2 (10) | " | D-1 (140° C., 30 min) | $1.0 \times 10^8$ | " | 3 | " | " |
| 21 | A-4 (90) | B-3 (10) | " | D-1 (140° C., 30 min) | $3.5 \times 10^8$ | " | 4 | " | " |
| Comp. Ex. No. | | | | | | | | | |
| 1 | A-1 (100) | — | C-1 | D-1 (140° C., 30 min) | $1.1 \times 10^{10}$ | 0 | 2 | — | — |
| 2 | A-1 (100) | — | C-2 | D-1 (140° C., 30 min) | $1.1 \times 10^{10}$ | 0 | 2 | — | — |
| 3 | A-1 (100) | — | " | D-2 (140° C., 30 min) | $1.1 \times 10^{10}$ | 0 | 2 | — | — |
| 4 | A-1 (100) | — | " | D-3 (140° C., 30 min) | $1.1 \times 10^{10}$ | 0 | 2 | — | — |
| 5 | A-1 (100) | — | " | D-4 (80° C., 30 min) | $1.1 \times 10^{10}$ | 0 | 2 | — | — |
| 6 | A-1 (96) | B-1 (4) | — | D-1 (140° C., 30 min) | $2.7 \times 10^{10}$* | 3 | 4 | 0/100 | — |
| 7 | A-1 (90) | B-2 (10) | — | D-1 (140° C., 30 min) | $4.2 \times 10^{10}$* | 3 | 3 | 0/100 | — |
| 8 | A-1 (90) | B-3 (10) | — | D-1 (140° C., 30 min) | $6.4 \times 10^{11}$* | 3 | 4 | 0/100 | — |
| 9 | A-1 (96) | B-1 (4) | — | D-2 (140° C., 30 min) | $2.7 \times 10^{10}$* | 3 | 4 | 0/100 | — |
| 10 | A-1 (96) | B-1 (4) | — | D-3 (140° C., 30 min) | $2.7 \times 10^{10}$* | 3 | 4 | 0/100 | — |
| 11 | A-1 (96) | B-1 (4) | — | D-4 (80° C., 30 min) | $2.7 \times 10^{10}$* | 3 | 4 | 0/100 | — |
| 12 | A-2 (100) | — | C-1 | D-1 (140° C., 30 min) | $5.0 \times 10^{11}$ | 0 | 1 | — | — |
| 13 | A-2 (100) | — | C-3 | D-1 (140° C., 30 min) | $5.0 \times 10^{11}$ | 0 | 1 | — | — |
| 14 | A-2 (100) | — | " | D-3 (140° C., 30 min) | $8.1 \times 10^{10}$* | 0 | 1 | — | — |
| 15 | A-1 (96) | B-1 (4) | — | D-1 (140° C., 30 min) | $3.8 \times 10^{10}$* | 3 | 4 | 100/100 | 0/100 |
| 16 | A-1 (90) | B-2 (10) | — | D-1 (140° C., 30 min) | $1.9 \times 10^{11}$* | 3 | 3 | 100/100 | 0/100 |
| 17 | A-1 (90) | B-3 (10) | — | D-1 (140° C., 30 min) | $4.3 \times 10^{11}$* | 3 | 4 | 100/100 | 0/100 |
| 18 | A-3 (100) | — | C-4 | D-1 (140° C., 30 min) | $6.0 \times 10^{11}$ | 0 | 1 | — | — |
| 19 | A-3 (96) | B-1 (4) | — | D-1 (140° C., 30 min) | $5.1 \times 10^9$* | 4 | 4 | 100/100 | 0/100 |
| 20 | A-3 (90) | B-2 (10) | — | D-1 (140° C., 30 min) | $3.5 \times 10^{10}$* | 3 | 3 | 100/100 | 0/100 |
| 21 | A-3 (90) | B-3 (10) | — | D-1 (140° C., 30 min) | $6.3 \times 10^{10}$* | 3 | 4 | 100/100 | 0/100 |
| 22 | A-4 (100) | — | C-5 | D-1 (140° C., 30 min) | $8.0 \times 10^{10}$ | 0 | 1 | — | — |
| 23 | A-4 (96) | B-1 (4) | — | D-1 (140° C., 30 min) | $7.1 \times 10^8$* | 4 | 4 | 100/100 | 0/100 |
| 24 | A-4 (90) | B-2 (10) | — | D-1 (140° C., 30 min) | $4.8 \times 10^{10}$* | 3 | 3 | 100/100 | 0/100 |
| 25 | A-4 (90) | B-3 (10) | — | D-1 (140° C., 30 min) | $8.1 \times 10^{10}$* | 3 | 4 | 100/100 | 0/100 |

Note 1):
A-1: polyacetal resin (trade name "Duracon"; a product of Polyplastics Co., Ltd.)
A-2: polybutylene terephthalate resin (trade name "Duranex"; a product of Polyplastics Co., Ltd.)
A-3: crystalline polyester resin (trade name "Vectra"; a product of Polyplastics Co., Ltd.)
A-4: polyphenylene sulfide resin (trade name "Fortron"; a product of Kureha Chemical Industry Co., Ltd.)
Note 2):
B-1: Ketjen black EC (a particle diameter of 0.03 μm) (a product of Lion Corp.)
B-2: carbon fiber (a fiber diameter of 0.018 μm; a length of 0.13 mm) (a product of Kureha Chemical Industry Co., Ltd.)
B-3: conductive potassium titanate whisker (a fiber diameter of 0.2 to 0.5 μm; a length of 10 to 20 μm) (trade name "Dentall TM"; a product of Otsuka Chemical Co., Ltd.)
Note 3):
C-1: Plasma etching: Etching was conducted with a device of 13.56 MHz internal electrode system under the following conditions:
$O_2$ plasma
treating pressure: 0.05 Torr
discharge power: 70 W
treating time: 5 min
C-2: 98% sulfuric acid/85% phosphoric acid/water: 40/25/35 (wt %) Etched at 40° C. for 5 min.
C-3: 30% sodium hydroxide Etched at 60° C. for 5 min.
C-4: 43% sodium hydroxide Etched at 60° C. for 5 min.
C-5: 60% nitric acid Etched at 30° C. for 10 min.
Note 4):
D-1: melamine alkyd paint (Amilac; a product of Kansai Paint Co., Ltd.)
D-2: Acrylic paint (Belcoat No. 5800; a product of Nippon Oils & Fats Co., Ltd.)
D-3: polyester paint (Melami No. 1500; a product of Nippon Oils & Fats Co., Ltd.)
D-4: acrylic urethane paint (Soflex No. 5000; a product of Kansai Paint Co., Ltd.)
Note 5):
Molded articles with an asterisk "*" which had not been subjected to surface roughening were degreased with isopropyl alcohol and then subjected to surface resistivity measurements.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An electrostatic spray-coated article which consists essentially of:

a polycrystalline resin; and between 2 to 100 parts by weight, based on 100 parts by weight of the polycrystalline resin, of an electrically conductive filler in admixture with said polycrystalline resin to achieve a surface resistivity of between $10^0$ to $10^9\Omega$, said electrically conductive filler being at least one selected from the group consisting of (i) electrically conductive particulate fillers having an average particle size of 30 $\mu$m or less, and (ii) electrically conductive fibrous material having an average fiber diameter of 30 $\mu$m or less, wherein said polycrystalline resin normally has a surface skin, and wherein said article includes at least one surface region where said skin of said polycrystalline resin is removed so as to expose a portion of said filler material; and wherein said article includes an electrostatically applied surface coating adhered to said at least one surface region.

2. An article as in claim 1, wherein said particulate electrically conductive filler is present in an amount between 5 to 60 parts by weight based upon 100 parts by weight of said polycrystalline resin.

3. An article as in claim 1, wherein said polycrystalline resin is selected from polyacetal, polyester, and polyphenylene sulphide resins.

* * * * *